(12) United States Patent
Gupta et al.

(10) Patent No.: US 6,272,594 B1
(45) Date of Patent: *Aug. 7, 2001

(54) METHOD AND APPARATUS FOR DETERMINING INTERLEAVING SCHEMES IN A COMPUTER SYSTEM THAT SUPPORTS MULTIPLE INTERLEAVING SCHEMES

(75) Inventors: Anurag Gupta, Santa Clara; Amil Kabil, Sunnyvale, both of CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,239

(22) Filed: Jul. 31, 1998

(51) Int. Cl.$^7$ ...................................... G06F 12/00
(52) U.S. Cl. ........................ 711/127; 711/157; 711/168; 711/5
(58) Field of Search ................................... 711/170, 117, 711/122, 127, 150, 157, 168, 5

(56) References Cited

U.S. PATENT DOCUMENTS

| | | | |
|---|---|---|---|
| 5,333,296 | * | 7/1994 | Bouchard et al. ............... 711/171 |
| 5,461,718 | * | 10/1995 | Tatosian et al. ................. 711/206 |
| 5,890,195 | * | 3/1999 | Rao .................................. 711/105 |
| 6,070,227 | * | 5/2000 | Rokicki ............................ 711/117 |
| 6,108,745 | * | 8/2000 | Gupta et al. ......................... 711/3 |

* cited by examiner

*Primary Examiner*—Matthew Kim
*Assistant Examiner*—Matthew D. Anderson
(74) *Attorney, Agent, or Firm*—David A. Plettner

(57) ABSTRACT

A method and apparatus determines interleaving schemes in a computer system that supports multiple interleaving schemes. In one embodiment, a memory interleaving scheme lookup table is used to assign memory interleaving schemes based on the number of available bank bits. In another embodiment, the percentage of concurrent memory operations is increased by assigning memory interleaving schemes to bank bits based on the classification of bank bits. The present invention supports a memory organization that provides separate memory busses that support independent simultaneous memory transactions, and memory bus segments that allow memory read operations to be overlapped with memory write operations, with each memory bus segment capable of carrying single memory operation at any given time. Bank bits that distinguish between memory busses are classified as class A, bank bits that distinguish between memory bus segments are classified as class B, and bank bits that distinguish between banks on a single memory bus segment are classified as class C. The memory controller supports multi-cache line interleaving (MCI), cache effect interleaving (CEI), and DRAM page interleaving (DPI). The memory operations associated with MCI tend to be independent, simultaneous, and unrelated. Therefore, class A bank bits are optimally allocated to MCI. The memory operations associated with CEI tend to occur in read/write pairs. Therefore, class B bank bits are optimally allocated to CEI. The memory operations associated with DPI tend to be serial in nature, and tend to be of the same type. Therefore, class C bank bits are optimally allocated DPI. In one embodiment, banks bits are assigned to memory interleaving schemes based on the classification of the bank bits using a memory interleaving scheme lookup table. In another embodiment, an algorithm is used to assign bank bits to interleaving schemes.

1 Claim, 5 Drawing Sheets

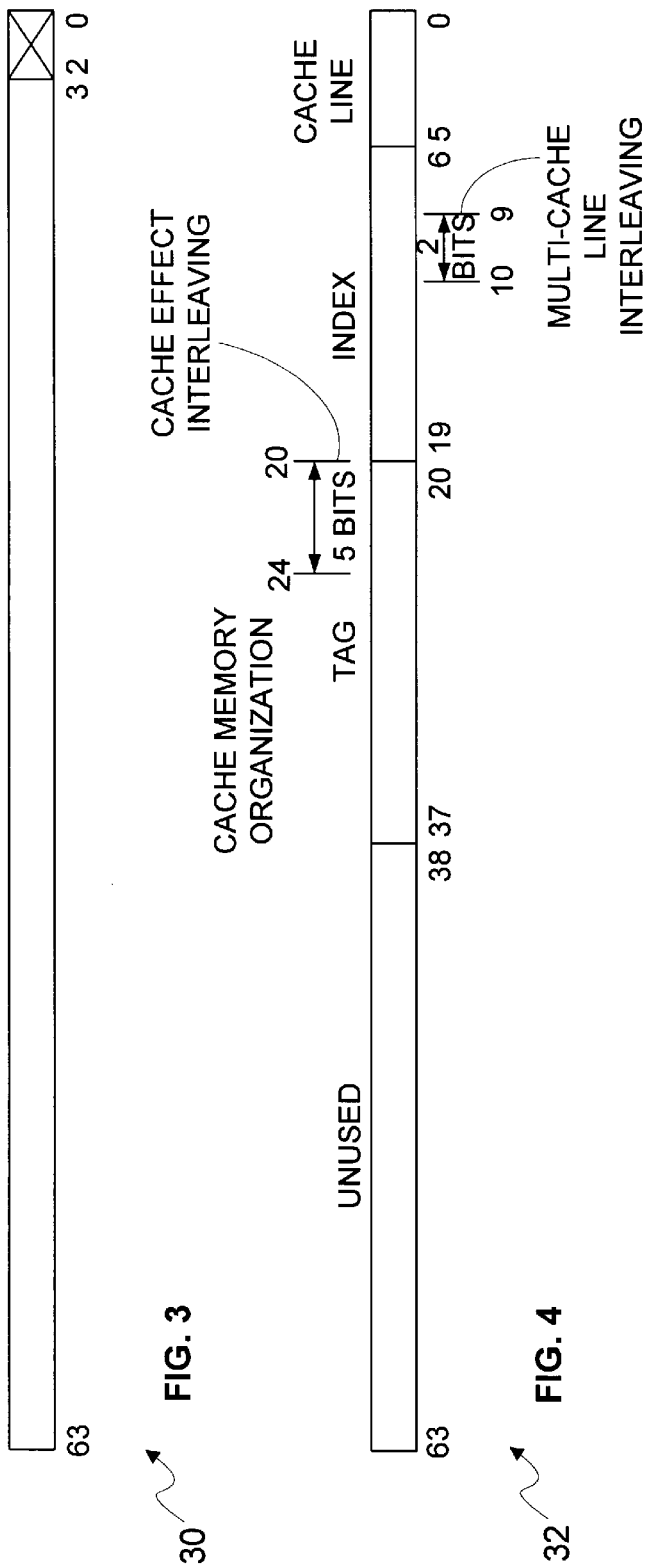
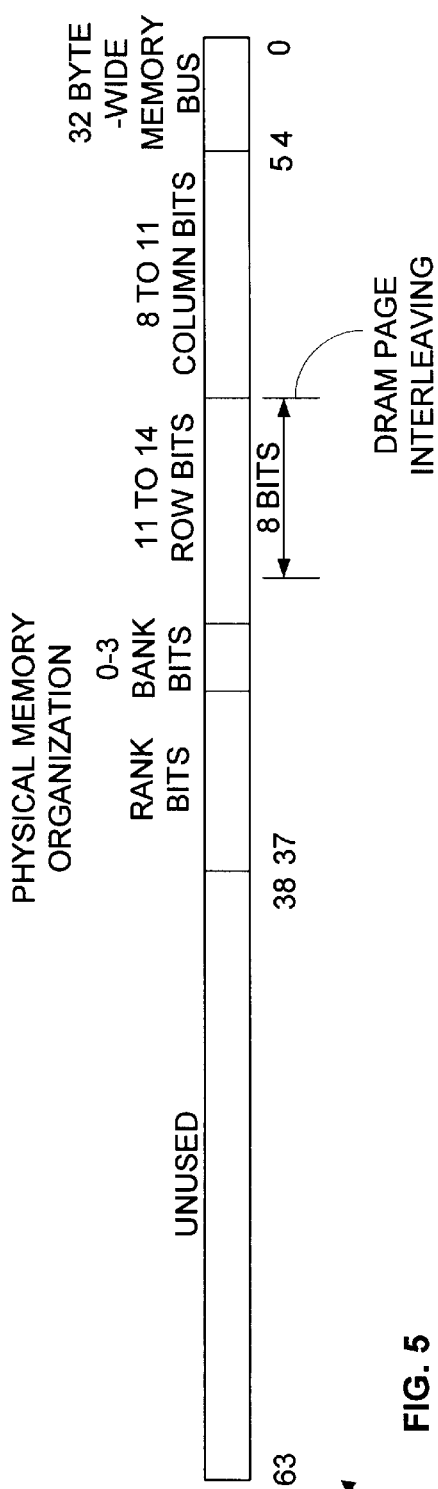
FIG. 3
FIG. 4
FIG. 5

| ROW # | COLUMN # | | | | | | | |
|---|---|---|---|---|---|---|---|---|
| | 8 | 7 | 6 | 5 | 4 | 3 | 2 | 1 |
| 1 | | | | | | | | MCI |
| 2 | | | | | | | CEI | MCI |
| 3 | | | | | | CEI | MCI | MCI |
| 4 | | | | | DPI | CEI | MCI | MCI |
| 5 | | | | DPI | DPI | CEI | MCI | MCI |
| 6 | | | DPI | DPI | CEI | CEI | MCI | MCI |
| 7 | | DPI | DPI | DPI | CEI | CEI | MCI | MCI |
| 8 | DPI | DPI | DPI | CEI | CEI | CEI | MCI | MCI |

| ROW # (Na, Nb, Nc) | \multicolumn{8}{c}{COLUMN #} | | | | | | | |
|---|---|---|---|---|---|---|---|---|
| | 8 | 7 | 6 | 5 | 4 | 3 | 2 | 1 |
| (0,0,0) |   |   |   |   |   |   |   |   |
| (0,0,1) |   |   |   |   |   |   |   | DPI |
| (0,0,2) |   |   |   |   |   |   | DPI | DPI |
| (0,0,3) |   |   |   |   |   | DPI | DPI | DPI |
| (0,0,4) |   |   |   |   | DPI | DPI | DPI | DPI |
| (0,0,5) |   |   |   | DPI | DPI | DPI | DPI | DPI |
| (0,1,0) |   |   |   |   |   |   |   | CEI |
| (0,1,1) |   |   |   |   |   |   | DPI | CEI |
| (0,1,2) |   |   |   |   |   | DPI | DPI | CEI |
| (0,1,3) |   |   |   |   | DPI | DPI | DPI | CEI |
| (0,1,4) |   |   |   | DPI | DPI | DPI | DPI | CEI |
| (0,1,5) |   |   | DPI | DPI | DPI | DPI | DPI | CEI |
| (0,2,0) |   |   |   |   |   |   | CEI | CEI |
| (0,2,1) |   |   |   |   |   | DPI | CEI | CEI |
| (0,2,2) |   |   |   |   | DPI | DPI | CEI | CEI |
| (0,2,3) |   |   |   | DPI | DPI | DPI | CEI | CEI |
| (0,2,4) |   |   | DPI | DPI | DPI | DPI | CEI | CEI |
| (0,2,5) |   | DPI | DPI | DPI | DPI | DPI | CEI | CEI |
| (1,0,0) |   |   |   |   |   |   |   | MCI |
| (1,0,1) |   |   |   |   |   |   | DPI | MCI |
| (1,0,2) |   |   |   |   |   | DPI | DPI | MCI |
| (1,0,3) |   |   |   |   | DPI | DPI | DPI | MCI |
| (1,0,4) |   |   |   | DPI | DPI | DPI | DPI | MCI |
| (1,0,5) |   |   | DPI | DPI | DPI | DPI | DPI | MCI |
| (1,1,0) |   |   |   |   |   |   | CEI | MCI |
| (1,1,1) |   |   |   |   |   | DPI | CEI | MCI |
| (1,1,2) |   |   |   |   | DPI | DPI | CEI | MCI |
| (1,1,3) |   |   |   | DPI | DPI | DPI | CEI | MCI |
| (1,1,4) |   |   | DPI | DPI | DPI | DPI | CEI | MCI |
| (1,1,5) |   | DPI | DPI | DPI | DPI | DPI | CEI | MCI |
| (1,2,0) |   |   |   |   |   | CEI | CEI | MCI |
| (1,2,1) |   |   |   |   | DPI | CEI | CEI | MCI |
| (1,2,2) |   |   |   | DPI | DPI | CEI | CEI | MCI |
| (1,2,3) |   |   | DPI | DPI | DPI | CEI | CEI | MCI |
| (1,2,4) |   | DPI | DPI | DPI | DPI | CEI | CEI | MCI |
| (1,2,5) | DPI | DPI | DPI | DPI | CEI | CEI | CEI | MCI |

FIG. 7

METHOD AND APPARATUS FOR DETERMINING INTERLEAVING SCHEMES IN A COMPUTER SYSTEM THAT SUPPORTS MULTIPLE INTERLEAVING SCHEMES

CROSS REFERENCE TO RELATED APPLICATION

The present application contains subject matter related to co-pending U.S. Pat. No. 6,070,227 entitled "A Main Memory Bank Indexing Scheme That Optimizes Consecutive Page Hits by Linking Main Memory Bank Address Organization to Cache Memory Address Organization" by Tomas G. Rokicki, which was filed Oct. 31, 1997. The present application also contains subject matter related to co-pending U.S. Pat. No. 6,108,745 entitled "A Fast And Compact Address Bit Routing Scheme That Supports Various Dram Bank Sizes And Multiple Interleaving Schemes" by Anurag P. Gupta et. al, which was filed on Oct. 31, 1997. Both of these applications are assigned to the same assignee as the present invention and are hereby incorporated by reference.

FIELD OF THE INVENTION

The present invention relates to computer memory systems. More specifically, the present invention relates to routing address signals to memory banks in a computer system to achieve various memory interleaving strategies.

DESCRIPTION OF THE RELATED ART

In the art of computing, it is common to store program instructions and data in dynamic random access memory (DRAM). The most common type of DRAM memory cell is a single transistor coupled to a small capacitor. A data bit is represented in the memory cell by the presence or absence of charge on the capacitor. The cells are organized into an array of rows and columns.

FIG. 1 is a block diagram of a typical prior art memory chip 10 that is based on a 4 megabit memory array 12 having 2,048 rows and 2,048 columns. Memory chip 10 has a 4 bit wide data input/output path. Row demultiplexer 15 receives an 11 bit row address and generates row select signals that are provided to memory array 12. Page buffer 14 acts as a temporary storage buffer for rows of data from array 12. Column multiplexer 16 receives a 9 bit column address and multiplexes the 4 bit data input/output path to a selected portion of buffer 14.

The distinction between rows and columns is significant because of the way a memory access proceeds. Page buffer 14 is formed from a single row of cells. The cells act as a temporary staging area for both reads and writes. A typical DRAM access consists of a row access cycle, one or more column accesses cycles, and a precharge cycle. The precharge cycle will be described in greater detail below.

The row access cycle (also called a page opening) is performed by presenting the row address bits to row demultiplexer 15 to select a row. The entire contents of that row are then transferred into page buffer 14. This transfer is done in parallel, and it empties all memory cells in that row of their contents. The transfer is done by driving whatever charge exists in each row capacitor down to a set of amplifiers that load page buffer 14. This operation also erases the contents of the capacitors of the row that is accessed. For typical prior art DRAMs, this operation takes approximately 30 ns.

Next, the column access cycle is performed by presenting the column address bits to select a particular column or set of columns, and the data is either read from or written to page buffer 14. During the column access cycle, page buffer 14 acts as a small RAM. The typical access delay for this operation is approximately 30 ns to receive the first 4 bits of data, and 10 ns to receive subsequent 4 bit chunks of data. Several consecutive accesses can be made to the page to access different columns, thereby allowing the entire row to be written to or read from very quickly. For a typical four bit wide DRAM such as that shown in FIG. 1, a page of 2,048 bits (or 256 bytes) can be read out in 512 accesses, or 5.14 $\mu$s. Accordingly, the bandwidth of DRAM chip 10 is 49.8 megabytes per second. It is easy to see how a few DRAM chips in parallel can yield very high bandwidth.

The final cycle of the memory access is the precharge cycle, which is also known in the art as page closing. As discussed above, the row access cycle destroyed the contents of the capacitors of the row that was read into buffer 14. Before another row can be read into buffer 14, the contents in page buffer 14 must be transferred back to memory array 12. This process is called the precharge cycle. In most prior art DRAM chips, no address is required because the address of the open row is latched when the contents of that row are transferred into buffer 14, and that address is retained as long as the page is open. Typically, the precharge cycle lasts about 40 ns.

In addition to the normal read and write access cycles, most DRAMs also require refresh cycles. The small capacitors that make up each memory cell suffer from leakage, and after a short period of time, the charge will drain away. To prevent the loss of data, each row must be precharged (opened and closed) at a certain minimum rate. The size of the capacitors and leakage allowed is balanced with the size of the array in such a way that the number of refresh cycles required is a small fraction of the total bandwidth of the DRAM. Typically, DRAMs are engineered such that refreshing the rows at a rate of one row per 15.6 microseconds is sufficient to maintain the data. Accordingly, while data can be written to and read from page buffer 14 many consecutive times, buffer 14 cannot be held open indefinitely because it must be periodically closed to allow other rows to be refreshed.

There are two primary types of DRAMs known in the art, asynchronous DRAMs and synchronous DRAMs. Asynchronous DRAMs do not have a clock input. Rather, complex timing constraints among various signals and addresses must be satisfied in order for the DRAM to operate properly. The two main control pins for asynchronous DRAMs are "row address strobe" (RAS) and "column address strobe" (CAS). To open a row, RAS is asserted (typically, lowered). To close a row, RAS is deasserted. To access a column CAS is asserted, and to access another column, CAS must be deasserted and then reasserted. Note that CAS can be asserted and deasserted multiple times while RAS is asserted.

In contrast to asynchronous DRAMs, synchronous DRAMs (SDRAMs) accept a clock input, and almost all timing delays are specified with respect to this clock. In addition, SDRAMs usually have between two and eight different logical arrays of memory (or banks) that can operate independently. Rather than use separate RAS and CAS signals for each bank, a sequence of commands is sent to the DRAM synchronously to perform page opening, column access, and page closing functions. Additional address bits are used for bank selection. One major benefit provided by SDRAMs is pipelining. While one bank is being accessed, another bank can be refreshed or precharged in the background.

Despite these differences, SDRAM organization is very similar to asynchronous DRAM organization. In fact, many memory controllers for asynchronous DRAMs support multiple banks and background refreshing and precharging operations.

In the prior art, the term "bank" was traditionally used to denote a group of asynchronous DRAM chips that where accessed in parallel. Accordingly, a bank was accessed by generating a bank select signal, along with appropriate row and column addresses, as described above. However, a single SDRAM chip has multiple banks. Therefore, the term "rank" is used to denote a group of SDRAM chips that are accessed in parallel, and additional bank bits are routed to the SDRAM rank. In a system capable of supporting either SDRAMs or asynchronous DRAMs, typically the higher order bank bits that are used when accessing asynchronous DRAMs are used as rank bits when accessing SDRAMs, and the lower order bank bits that are used when accessing asynchronous DRAMs are routed to the SDRAMs. It should be noted that each bank within an SDRAM rank has its own set of page buffers.

DRAM chips can be organized to form main memory systems in a variety of ways. Typically the width and speed of the system bus are synchronized to the width and speed of the main memory system bus by providing the main memory system bus with the same bandwidth as the system bus. Usually system busses are both faster and wider than the data I/O interface provided by individual DRAM chips, so multiple DRAM chips are arranged in parallel to match the bandwidth of the system bus. If a particular computer system has a 16 byte wide data bus that operates at 66 MHZ, then a main memory subsystem of the computer system that operates at 33 MHZ and is constructed with 4-bit wide DRAM chips will typically have 64 DRAM chips arranged in each bank, thereby providing each bank with a bandwidth of nearly a gigabyte per second, which matches the bandwidth of the system data bus. If the bandwidths are not matched, other techniques may be employed, such as using a small FIFO to buffer memory accesses and blocking memory accesses when the FIFO is full.

Consider the page buffers of the DRAM chips that form a single bank. All the individual page buffers are accessed in parallel, thereby combining to form a larger "logical" page buffer. As shown in FIG. 1, each DRAM chip 10 has a 2,048 bit, or 256 byte, page buffer 14. If 32 chips are arranged in parallel, the logical page buffer is 8,192 bytes wide. If the low order address bits are used to index columns, two memory locations having addresses that differ only in the lower 13 bits of the logical memory address will be in the same row, and therefore will be available in a logical page buffer concurrently.

Each bank of DRAM chips has its own set of page buffers. Therefore, a logical page buffer exists for each memory bank provided in the computer system. If the high order address bits are used to select banks, then there is an 8 kilobyte logical page buffer for the first 16 megabytes of physical memory, another 8 kilobyte logical page buffer for the next 16 megabytes of physical memory, and so on.

If the system described above employed SDRAMs having bank select bits, the internal banks of the SDRAMs may be viewed as collections of relatively independent banks of DRAMs, with the high order bank bits used as rank select bits and the low order bank bits routed to the SDRAMs. Accordingly, for the purpose of illustrating the present invention below, there is little difference between the memory banks that are derived from collections of chips addressed independently, and the memory banks within SDRAM chips, except that in the latter case some of the bank bits are routed to the SDRAM chips.

Consider a typical cache line read in the system described above. First, the appropriate bank is selected, and then a row is transferred into the logical page buffers. This takes approximately 30 ns. Next, 4 16-byte chunks are read from the logical page buffer; this takes approximately 60 ns (30 ns for the first 16 byte chunk, and 10 ns for each of the next three 16 byte chunks), and provides a complete cache line. Finally, the logical page buffer is closed; this takes 40 ns. The total time was 130 ns. The time before the first word was read was 60 ns (page open plus first column access). Many system are configured such that the first word available is the first word required by the CPU. The time required to retrieve the first word is known in the art as the "critical word latency".

It is common in the art for a memory controller to gamble that successive references to the same memory bank will access the same row (or page). Such a memory controller is known as a page mode memory controller. A page hit occurs when the memory controller processes a memory access request, and finds that the row that needs to be accessed is already in the logical page buffer. In a page mode memory controller, the page is not closed after an access. Instead, the page is only closed when an access to that bank requires a different page or a refresh cycle occurs.

If a subsequent memory access is indeed for the same page, then the critical word latency is shortened from 60 ns to just 10 ns, a significant savings. If a subsequent memory access is not for the same page, then a penalty is incurred. The old page stored in the logical page buffer must undergo a precharge cycle before a new page can be opened, so the critical word latency is 40 ns (precharge) plus 30 ns (row access) plus 30 ns (first word available), or 100 ns, quite a bit more than the previous value of 60 ns that is achieved when the logical page buffer is precharged after every access.

If p is the probability that the next access is on the same page, then the average critical word latency is 30 ns*p+100 ns*(1−p), (or 100 ns−70 ns*p). Note that the critical word latency decreases asp increases. The point at which the gamble pays off is when the average critical word latency is 60 ns, which, as described above, is the critical word latency achieved when the logical page buffer is closed after each memory access. Accordingly, the point at which it pays to keep the logical page buffer open after each access occurs when there is a greater than 0.571 probability that a sequential memory access will reference the same page.

Assume that in a computer system having a page mode memory controller, requests are fed to the memory controller as fast as they can be consumed. Each time a page in a bank is accessed for the first time requires a precharge cycle to close the old page and a row access page to open the new page, which together require 70 ns. As described above, each cache line access from an open page requires 60 ns. Thus, an average cache line access requires 60 ns+70 ns (1−p). In contrast, as discussed above, a non-page mode memory controller requires 90 ns.

In the prior art, many page mode memory controllers simply mapped column bits to the least significant bits of the address, mapped row bits to the address bits immediately after the column bits, and then mapped bank select bits to the highest bits of the address. Given this configuration, assume that a large contiguous memory block that spans page boundaries must be accessed. As long as memory is being accessed from a single page buffer, no precharge cycles are required. However, when the end of the page is reached and the next page is required, a precharge cycle is required to store the old page and a row access cycle is required to access the new page. Since the row bits are arranged as described above, the next row required will be in the same bank as the previous row (unless the memory block spans a bank boundary).

U.S. Pat. No. 5,051,889 to Fung et al. and entitled "Page Interleaved Memory Access" provides an improvement when accessing contiguous memory that spans page boundaries. Basically, Fung et al. swap the first bank select bit with the first row select bit, thereby causing even memory pages to be stored in a first bank, and odd memory pages to be stored in a second bank. Accordingly, when a series of sequential memory accesses to a contiguous segment of memory cross a page boundary, the memory accesses also cross a bank boundary, which allows the precharge cycle of the first bank to be overlapped with the row access cycle of the second bank. The system disclosed by Fung et al. also allows two contiguous pages to be open at once, thereby allowing a program with an active "hot spot" that spans two contiguous pages to achieve a higher page hit rate.

A similar technique was proposed by Mike Bell and Tom Holman in a paper entitled "Pentium® Pro Workstation/Server PCI Chipset", which was published in the Digest of Papers of the 41$^{st}$ IEEE Computer Society International Conference held Feb. 25–28, 1996. The technique proposed by Bell and Holman is called address bit permuting, and like the memory scheme disclosed by Fung et al., involves swapping a bank bits and row bits.

While it is desirable to increase page hit rates, in a multi-processor system, it is also desirable to distribute memory accesses among different banks. One of the easiest ways to do this is to ensure that each processor distributes its accesses across different banks. One method known in the art that provided this feature is referred to as "cache line interleaving". Basically, cache line interleaving routes one or more bank bits to the address bits immediately above a cache line. Therefore, one cache line is stored in a first bank, the next cache line is stored in a second bank, and so one. In non-page mode controllers, this allows row access cycles and precharge cycles to be overlapped as contiguous cache lines are accessed. It also ensures that each processor's memory accesses are evenly distributed across memory banks, and thereby ensures that multiple processors will not be continuously contending for the same bank. Of course, cache line interleaving seeks to distribute multiple accesses across many banks, while a page mode controller seeks to route multiple accesses to the same bank, so these techniques are in conflict.

In a typical computer system memory is usually provided by single in-line memory modules (SIMMs) and/or dual in-line memory modules (DIMMs). The DIMMs and SIMMs are typically constructed using asynchronous DRAM chips or SDRAM chips. Usually a computer system will have a series of SIMM and/or DIMM sockets that accept the memory modeules. Since SIMMs and DIMMs come in a variety of configurations, are constructed from different types of chips, and all sockets need not be populated, a memory controller of the computer system must have the ability to route address bits to various rank, bank, row, and column bits. Providing page interleaving greatly complicates this routing.

SUMMARY OF THE INVENTION

The present invention provides a method an apparatus for determining interleaving schemes in a computer system that supports multiple interleaving schemes. In one embodiment, a memory interleaving scheme lookup table is used to assign memory interleaving schemes based on the number of available bank bits.

Another embodiment of the present invention is based on the realization that the percentage of concurrent memory operations may be increased by assigning memory interleaving schemes to bank bits based on the classification of bank bits. Consider a memory controller that provides separate memory busses that support independent simultaneous memory transactions, with each bus coupled to a memory buffer/multiplexer unit that provides memory bus segments that allow memory read operations to be overlapped with memory write operations, with each memory bus segment capable of carrying a single memory operation at any given time. Bank bits that distinguish between memory busses are classified as class A, bank bits that distinguish between memory bus segments are classified as class B, and bank bits that distinguish between banks on a memory bus segment are classified as class C.

Assume that the memory controller supports multi-cache line interleaving, cache effect interleaving, and DRAM page interleaving. Multi-cache line interleaving attempts to distribute memory hot spots across several banks so that multiple CPUs tend not to access the same memory bank at the same time. The memory access patterns associated with multi-cache line interleaving will tend to be independent and unrelated. Multiples write may occur simultaneously, multiple reads may occur simultaneously, reads and writes may occur simultaneously, and so on. Therefore, class A bank bits are optimally allocated to multi-cache line interleaving.

A dirty cache line is a cache line that contains memory contents which have been altered by the processor. Therefore the cache line contents must be written back to main memory before the cache line can be replaced. Cache effect interleaving allows a dirty cache line that is cast out from a set of a cache to be written to a different DRAM page than a cache line being read into the same set. Therefore, typically read and write operations will occur in pairs, as one cache line is read into the cache from one bank while another cache line is cast out from the cache and written to another bank. Therefore, class B bank bits are optimally allocated to cache effect interleaving. Class A bank bits could also be optimally allocated to cache-effect interleaving, but for the reasons discussed above, it is better to reserve class A bank bits multi-cache line interleaving, especially in a multi-processor system.

DRAM page interleaving causes contiguous (or proximate) DRAM pages to be stored in separate banks, thereby allowing a program to have a memory hot spot that remains open in more than one bank. The memory access patterns associated with DRAM page interleaving tend to be serial in nature, and tend to be of the same type. For example, when program code is loaded the cache, the program code will be loaded sequentially and most of the memory operations will be memory read operations. Similarly, when a program writes a block of data back to memory, the block of data will first be written to the cache, and the corresponding cache lines where the data is stored will all be dirty. If the cache lines that are replaced where also "dirtied" in a similar manner, then the cache lines that are cast out form the cache will tend to be serial and most of the operations will be memory write operations. Therefore, class C bank bits are optimally allocated DRAM page interleaving. Class A and B bank bits could also be optimally allocated to DRAM page interleaving, but for the reasons discussed above, it is better to reserve class A bank bits multi-cache line interleaving and bank B bits for cache effect interleaving.

In accordance with an embodiment of the present invention, memory interleaving schemes are assigned to bank bits based on the classification of the bank bits using a memory interleaving scheme lookup table. In another embodiment, memory interleaving schemes are assigned to bank bits based on the classification of the bank bits using an algorithm.

The present invention provide a convenient, easy-to-configure method of allocating interleaving schemes to bank bits. The number of bank bits assigned to each interleaving scheme affects the page hit rate. In addition, the present invention allows the percentage of concurrent memory transactions to be increased by allocating bank bit to interleaving schemes based on the classification of the bank bits.

BRIEF DESCRIPTION OF THE DRAWINGS

FIG. 3 shows a logical address map of a computer system having a 64 bit wide address.

FIG. 4 shows the organization of a cache memory in a computer system.

FIG. 5 shows the organization of physical memory in a computer system.

FIG. 7 is a table showing another embodiment of the memory interleaving scheme lookup table of FIG. 2.

DETAILED DESCRIPTION OF THE PREFERRED EMBODIMENTS

Figure 1:
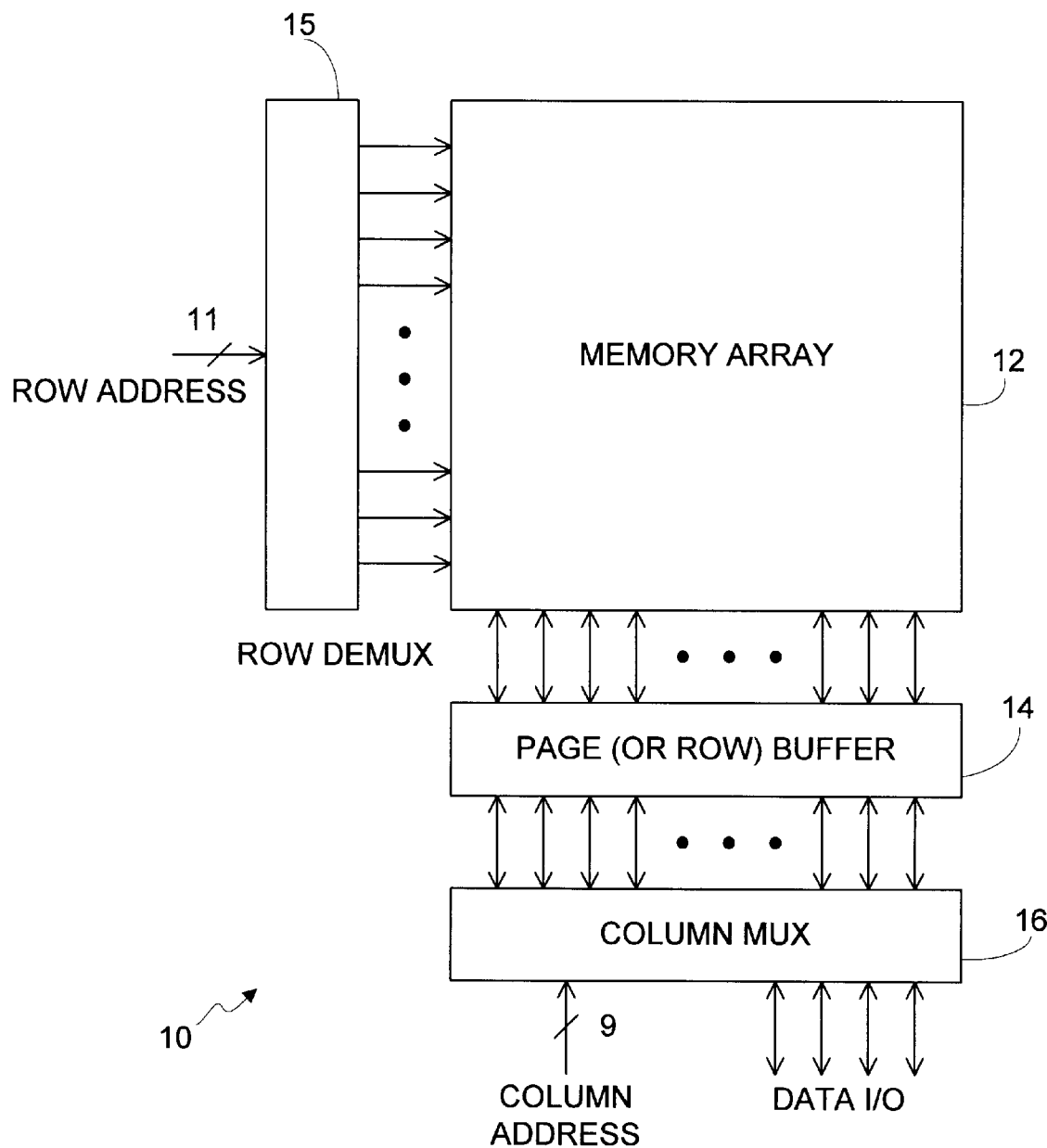
FIG. 1 is a block diagram of a typical prior art memory chip that is based on a 4 megabit memory array having 2,048 rows and 2,048 columns.
Figure 2:
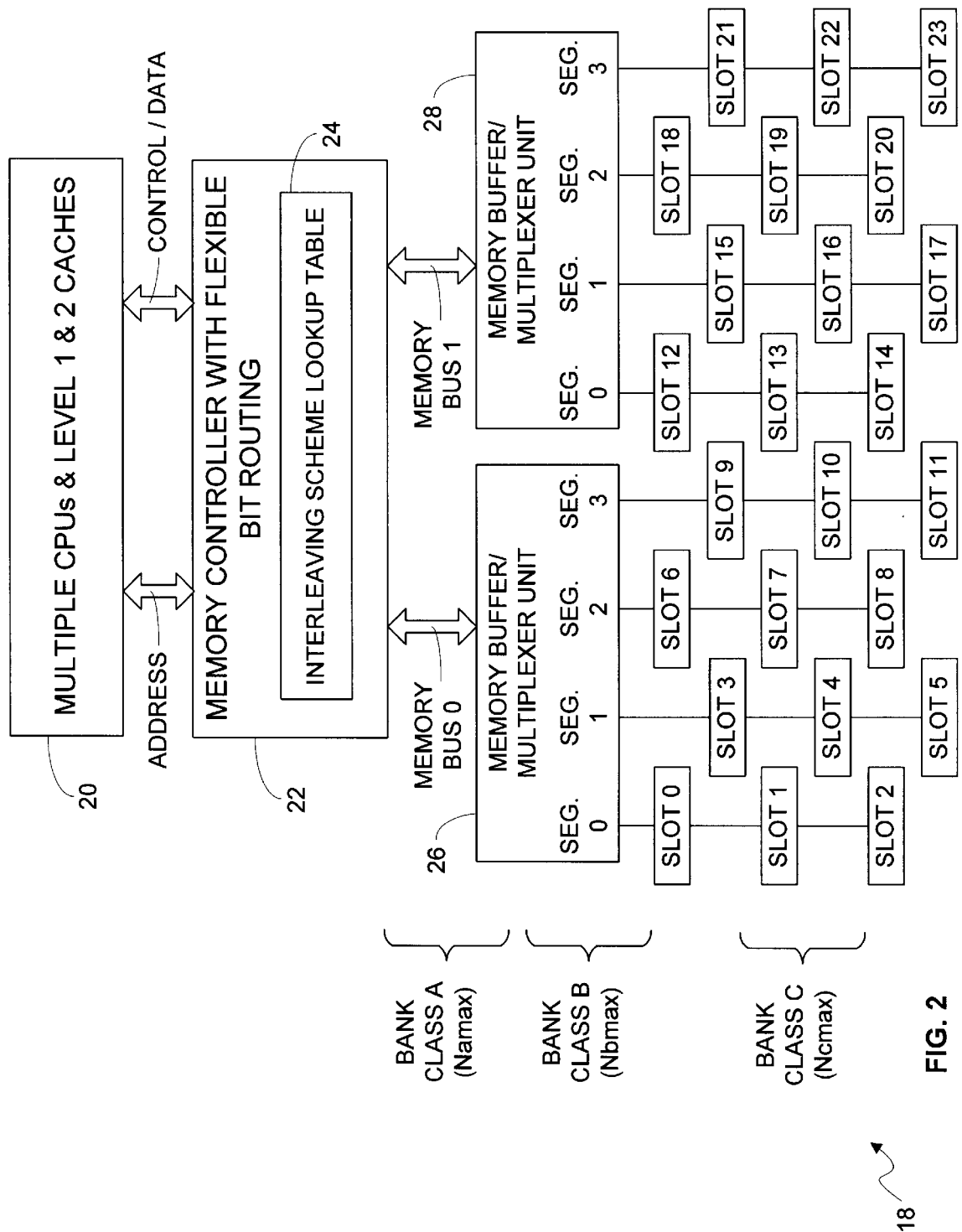
FIG. 2 is a block diagram of a computer system that incorporates a memory interleaving scheme lookup table in accordance with the present invention.

The present invention provides a method and apparatus for determining how to assign memory interleaving schemes to various bank bits in a computer system that supports a plurality of interleaving schemes. FIG. 2 is a block diagram of a computer system 18. The present invention will be described with reference to computer system 18, however those skilled in the art will recognize that the inventive concepts described herein may be applied to other computer system organization.

Computer system 18 includes multiple central processing units (CPUs) and level 1 and level 2 cache memories, which are represented by box 20. The CPUs and caches are coupled to memory controller 22 via an address bus and a control/data bus. Memory controller 22 includes flexible bit routing that supports a plurality of memory interleaving schemes, as described in co-pending U.S. patent application Ser. No. 08/962,490 entitled "A Fast And Compact Address Bit Routing Scheme That Supports Various Dram Bank Sizes And Multiple Interleaving Schemes" by Anurag P. Gupta et. al, which was filed on Oct. 31, 1997 and is incorporated by reference above. In accordance with the present invention, memory controller 22 is configured or programmed using interleaving scheme lookup table 24, which will be described below.

Memory controller 22 provides two memory busses: memory bus 0 and memory bus 1. The memory busses are independent, and carry separate memory transactions simultaneously. Each memory bus is coupled to a memory buffer/multiplexer unit. For example, memory bus 0 is coupled to memory buffer/multiplexer unit 26 and memory bus 1 is coupled to memory buffer/multiplexer unit 28. Each memory buffer/multiplexer unit provides four memory bus segments (labeled SEG. 0, SEG. 1, SEG. 2, SEG. 3 in FIG. 2) and each memory bus segment is coupled to three memory slots. For example, memory bus segment 1 of memory buffer/multiplexer unit 28 is coupled to memory slots 15, 16, and 17. The memory slots will typically be sockets adapted to receive memory modules, such as dual in-line memory modules (DIMMs) and single in-line memory modules (SIMMs).

Each memory buffer/multiplexor unit includes a buffer that receives data as it is read from a memory module. However, while a memory buffer/multiplexer unit is waiting to receive data from a memory module on one memory bus segment, the unit can also initiate write operations to memory modules on other memory segments. Accordingly, the memory buffer/multiplexer units can overlap read and write operations. Note that only one memory operation can be active on a single memory bus segment at one time.

One of primary benefits of the present invention is achieved by recognizing that the percentage of concurrent memory operations associated with a particular memory interleaving scheme is dependent upon the location of memory banks within the memory organization shown in FIG. 2. For example, consider that computer system 18 is populated with two memory banks. If one bank in slot 0 and the other bank in slot 12, then both banks can be active with any type of memory transaction simultaneously because each bank is serviced by a separate memory bus from memory controller 22. In contrast, if one bank is in slot 0 while another bank is in slot 3 (both banks serviced by the same memory buffer/multiplexer unit but each bank on a separate memory bus segment), then one bank can receive a write operation while the other bank can receive a read operation. However, both banks cannot receive the same type of operation at the same time because of the limitations of the memory buffer/multiplexer units discussed above. Finally, if both banks are on the same memory bus segment, only one memory operation may be active at one time.

In accordance with the present invention, bank bits are classified based in the hierarchy and functionality of the memory system. In FIG. 2, bank class A refers to bank bits that differentiate between memory bus 0 and memory bus 1. Bank class B refers to bank bits that differentiate between memory bus segments. Finally, bank class C refers to bank bits that differentiate between memory banks on a memory bus segments, including multiple banks within a memory module.

Before discussing the present invention in greater detail below, it is helpful to consider the various interleaving schemes supported by the present invention along with the memory access patterns typical of each scheme. In co-pending U.S. patent application Ser. No. 08/962,490 entitled "A Fast And Compact Address Bit Routing Scheme That Supports Various Dram Bank Sizes And Multiple Interleaving Schemes", Anurag P. Gupta et. al disclose an embodiment of a memory controller that supports 8 to 11 column bits, 11 to 14 row bits, 0 to 3 bank bits, and 1 to at least 6 rank bits. Note that rank bits refer to bits that differentiate between physical memory sockets, while bank bits refer to bits which select banks within a single memory module. For the purposes of this discussion, rank and bank bits are functionally equivalent.

The present invention supports three types of interleaving: DRAM page interleaving (DPI), cache effect interleaving (CEI), and multi-cache line interleaving (MCI). Note that the present invention can also be adapted to support other interleaving schemes.

DRAM page interleaving (also known as contiguous page interleaving) is known in the art and causes contiguous (or proximate) DRAM pages to be stored in separate banks. DRAM page interleaving is achieved by routing one or more of the address bits corresponding with the bits immediately above the column boundary to either bank or rank bits. DRAM page interleaving allows memory hot spots that span more than one DRAM page to remain open in separate DRAM pages. The memory controller disclosed by Anurag P. Gupta et. al supports allocating up to 8 bank or rank bits to DRAM page interleaving.

Cache effect interleaving was disclosed in a co-pending U.S. Patent Application entitled "A Main Memory Bank Indexing Scheme That Optimizes Consecutive Page Hits by Linking Main Memory Bank Address Organization to Cache Memory Address Organization" by Tomas G. Rokicki, which is incorporated herein by reference above. Cache effect interleaving greatly increases the probability that cache lines having the same index, but different tags, will be stored in different banks. Cache effect interleaving allows a dirty cache line that is cast out from a set of a cache to be written to a different DRAM page than a cache line being read into the same set. Typically, a series of cache lines are read into the cache from one DRAM page while a corresponding series of cache lines are cast out into another DRAM page. Without cache effect interleaving, a DRAM page would have to be opened and closed repeated as cache lines are read in and cast out because cache lines within a set will map to the same DRAM page. Cache effect interleaving is achieved by routing one or more of the address bits corresponding with the bits immediately above the cache memory index field to either bank or rank bits. The memory controller disclosed by Anurag P. Gupta et. al supports allocating up to 5 bank or rank bits to cache effect interleaving.

Finally, multi-cache line interleaving is a type of interleaving that was disclosed by Anurag P. Gupta et. al. As discussed above in the section entitled "Description of the Related Art", prior art cache-line interleaving is in conflict with DRAM page interleaving. On the one hand, it is desirable to have contiguous memory accesses go to same bank to increase the page hit rate, as provided by DRAM page leaving. On the other hand, in a multiprocessor system it is desirable that two or more processors do not thrash the same bank. In the prior art, cache-line interleaving addressed this problem by causing adjacent cache-lines to access different banks. Since the memory accesses of each processor are distributed across multiple banks, no two processors will thrash the same bank. Multi-cache line interleaving causes cache lines contained in the same small contiguous block to be contained in one DRAM page, while contiguous small blocks are stored on separate DRAM pages. For example, a first block of 8 contiguous cache lines are stored in a first DRAM page, a second block of 8 contiguous cache lines are stored in a second DRAM page, and so on. Multi-cache interleaving balances the desire to have a certain number of cache line accesses (such as 8 or 16) go to the same bank (and therefore achieve the benefits of DRAM page interleaving), while ensuring that small contiguous blocks of cache lines go to separate banks. Compared to cache line interleaving, which causes adjacent cache lines to be stored in separate banks, multi-cache line interleaving greatly increases the page hit rate by allowing a certain level of DRAM page interleaving, while maintaining a high probability that the hot spots of a program being accessed by a processor are distributed across multiple banks. Multi-cache line interleaving is achieved by routing one or more of the address bits corresponding with the bits immediately above a small contiguous block of cache lines to either bank or rank bits. The memory controller disclosed by Anurag P. Gupta et. al supports allocating up to 2 address bits to multi-cache line interleaving.

FIGS. 3–5 illustrate the architecture of the computer system for which the memory controller disclosed by Anurag P. Gupta et. al was designed. The architecture provides 64 bit wide address and data busses. However, the physical memory only uses 38 bits of the logical address, which provides up to 256 gigabytes of physical memory. FIG. 3 shows logical address map 30, which illustrates the 64 bit wide address of the computer system. Since the data bus is also 64 bits wide and accesses data in 8 byte units, the first three address bits, A[0]–A[2], are not provided externally by the processor.

FIG. 4 shows cache memory organization map 32. The cache has a capacity of 4 megabytes, has a 64 byte cache line, and a 14 bit index. The first six bits, A[0]–A[5], represent the cache line. The next 14 bits, A[6]–A[19] form the index and reference one of 16,384 sets, with each set including 4 cache line entries. The next 18 bits, A[20]–A[37] form the tag. A tag entry is associated with each cache line entry in the cache.

As illustrated in FIG. 4, the cache effect interleaving bits are available at the address bits corresponding to the 5 least significant bits of the tag, which are bits A[20]–A[24]. The multi-cache line interleaving bits, A[9]–A[10], are available starting 4 bits above the cache line boundary, which allows interleaving of 16 cache-line blocks between 2 banks or ranks, or interleaving of 8 cache-line blocks between 4 banks or ranks. Note that the positioning of the cache effect interleaving bits and the multi-cache line interleaving bits are determined by the cache organization. Specially, the multi-cache line interleaving bits are determined by the cache line size, and the cache-effect interleaving bits are determined by the boundary between the index and the tag.

FIG. 5 shows physical memory organization map 62. The organization of physical memory will, of course, vary based on the number and type of memory modules that are installed in the system. The physical memory is organized to provide a 32 byte wide memory bus, so two memory accesses are required to read or write a cache line.

The first 5 bits, A[0]–A[4], are inherently represented by the width of the memory bus. Note that the width of the bus simply determines the starting boundary of the column bits. With a 32 byte wide memory bus, the first column bit is A[5]. Also note that bits A[3] and A[4], are provided by the processor, but are not used as column bits because the memory bus is 32 bytes wide. However, these bits can be used to determine the order in which 4 64-bit words are packaged into a 32 byte wide memory access. If the memory bus is 16 bytes wide, the first column bit is A[4] and bit A[3] may be used to determine the order in which 2 64-bit words are packaged into a 16 byte wide memory access.

As mentioned above, if the memory bus is 32 bytes wide, the first column bit is bit A[5]. The next 8 to 11 bits are column bits, with the number of column bits determined by the sizes of the DRAM chips present on the memory modules. Note that the number of column, row, and bank bits may vary from rank to rank.

Immediately above the column bits are the bits which correspond to DRAM page interleaving. Up to 8 bits may be allocated to DRAM page interleaving, and the bit range responsible for DRAM page interleaving will vary based on the number of column bits.

Also immediately above the column bits are the row bits. The memory controller supports 11 to 14 row bits. The bank bits are immediately above the row bits. The memory controller supports 0 to 3 bank bits. Finally, the rank bits are above the bank bits. Each rank bit corresponds to a memory socket. In a system having memory modules populated by SDRAMs having 11 column bits, 14 row bits, and 3 bank bits, 6 rank bits are available. Of course, if smaller DRAM or SDRAM chips are used, more rank bits are available.

FIGS. 3–5 illustrate how the memory controller disclosed by Anurag P. Gupta et. al provides for DRAM page interleaving, cache effect interleaving, and multi-cache line interleaving. In contrast, the present invention provides a mechanism for distributing available bank bits among the various interleaving schemes. Note that the best distribution will be a function of the size and configuration of memory modules, the placement of memory modules within the memory organization hierarchy shown in FIG. 2, the number of CPUs in the computer system, and perhaps most importantly, the mix of applications executed by the computer system.

The only practical way to find the best distribution is by performing test runs that execute the anticipated mix of applications on a particular computer system while monitoring memory performance. Test runs may be executed for a variety of cache interleaving scheme distributions to determine which distributions result in the best performance.

In accordance with the present invention, interleaving scheme lookup table 24 of memory controller 22 of FIG. 2 provides a flexible method of initializing cache interleaving scheme distributions. For illustrative purposes, table 24 is shown as part of controller 22. However, table 24 may be implemented an any storage medium of computer system 18. Preferably, table 24 is implemented in non-volatile random access memory so that a BIOS routine can initialize the memory system when computer 18 is initialized. In such an implementation, a utility routine may easily write a cache interleaving scheme distribution into lookup table 24, and issue a reboot command that causes computer system 18 to re-initialize. Furthermore, an automated performance enhancement utility can continuously repeat the process of running a test suite with the anticipated mix of applications, recording the results, altering the distribution in table 24, and reinitializing computer system 18, until the optimal distribution is found.

Figure 6:
FIG. 6 is a table showing one embodiment of the memory interleaving scheme lookup table of FIG. 2.

In accordance with the present invention, assume memory controller 22 of FIG. 2 supports assignment of up to Nmax bank bits to various interleaving schemes. FIG. 6 is a table 36 showing one embodiment of interleaving scheme lookup table 24 of controller 22 wherein the maximum number of bank bits available for assignment among the various interleaving schemes (Nmax) is eight. To find the interleaving scheme for any particular number of bank bits, first access the row number that corresponds to the number of bank bits actually present. Within this row, each column indicates the interleaving scheme to be used for each bank bit, with the label "MCI" representing multi-cache line interleaving, the label "CEI" representing cache effect interleaving, and the label "DPI" representing DRAM page interleaving.

As mentioned above, the actual distribution stored in table 36 will vary based on a variety of factors. However, the values shown in table 36 represent what is expected to be a typical distribution. Specifically, it is believed that multi-cache line interleaving will tend to be the most important type of interleaving because it is important to increase the probability that memory hot spots caused by programs executing on multiple CPUs do not generally access the same bank at the same time. However, once two bank bits are allocated to multi-cache interleaving, the benefits achieved by allocating additional bits to multi-cache line interleaving are minimal compared to other interleaving schemes. Accordingly, when only one bank bit is available, it is allocated to multi cache-line interleaving, and when eight bank bits are available, only two bank bits are allocated to multi-cache line interleaving.

Furthermore, it is believed that cache effect interleaving will tend to be the second most important type of interleaving because it is important to quickly move data into and out of the cache. Once data is in the cache, execution proceeds more quickly. Therefore, when two bank bits are available, one is allocated to cache effect interleaving.

DRAM page interleaving is believed to generally be the third most important type of interleaving. Therefore, a bank bit is not allocated to DRAM page interleaving until there are four bank bits available. As mentioned above, the distribution shown in table 36 is only a typical distribution, and will vary based on the size and configuration of memory modules, the number of CPUs in the computer system, and the mix of applications executed by the computer system. For example, if a particular computer system only has a single CPU and a single bank bit, then cache effect interleaving may provide better performance than multi-cache line interleaving.

FIG. 7 is a table 38 showing another embodiment of interleaving lookup table 24 of controller 22. While the maximum number of bank bits available for assignment among the various interleaving schemes (Nmax) is eight in table 38, the distribution of bank bits is based on the locations of memory banks within the memory organization hierarchy shown in FIG. 2. Before discussing table 38 in detail, first consider the types of memory access patterns that are typically associated with each type of memory interleaving scheme.

Multi-cache line interleaving attempts to distribute memory hot spots across several banks so that multiple CPUs tend not to access the same memory bank at the same time. Accordingly, memory access patterns associated with multi-cache line interleaving will tend to be independent and unrelated. In other words, multiples write may occur simultaneously, multiple reads may occur simultaneously, reads and writes may occur simultaneously, and so on. With reference to FIG. 2, a bank bit that differentiates between the memory busses provide by memory controller 22 fits this access pattern, because each memory bus can carry separate memory operations of different types simultaneously. Accordingly, it makes sense to allocate bank bits that differentiate between memory busses to multi-cache line interleaving. In FIG. 2, these bank bits are classified as "bank class A", with Namax representing the maximum number of bank bits available in this class. In FIG. 2, Namax is one because only two memory busses are available from memory controller 22. Since bank bits which differentiate between memory busses fit the memory access patterns associated with multi-cache line interleaving so well, in other embodiments of memory controller 22, it is preferable to have additional memory busses so that additional bank bits that differentiate between memory busses can be allocated to multi-cache line interleaving. A memory controller having four memory busses would have two bits that differentiate between memory busses, while a memory controller having eight memory busses would have three bits that differentiate between memory busses.

Now consider the memory access patterns associated with cache effect interleaving. Cache effect interleaving allows a dirty cache line that is cast out from a set of a cache to be written to a different DRAM page than a cache line being read into the same set. Therefore, typically read and write operations will occur in pairs, as one cache line is read into the cache from one bank while another cache line cast out of the cache and written to another bank. Of course, the memory access pattern associated with cache effect interleaving would be well served by a bank bit that differentiates between memory busses, as described above. But the memory access pattern associated with cache effect interleaving would also be well served by bank bits that differentiate between memory bus segments provided by one of the memory buffer/multiplexer units, such as unit 26 in FIG. 2. As discussed above, the memory buffer/multiplexer units can overlap read and write operations, but cannot support simultaneous memory operations of the same type. Accordingly, as one cache line is being read from a bank on one memory bus segment of a memory buffer/multiplexer unit, the corresponding dirty cache line being cast out from the cache can be simultaneously written to a bank one another memory bus segment of the same buffer/multiplexer unit. Note that bank bits that differentiate between memory bus segments within a memory buffer/multiplexer unit match the memory access patterns associated with cache effect interleaving equally as well as bank bits that differentiate between memory busses provided by controller 22. However, the bank bits that differentiate between memory segments do not match the memory access patterns associated with multi-cache interleaving because multiple memory operations of the same type may occur simultaneously. Therefore, it makes sense to allocate bank bits that differentiate between memory bus segments to cache effect interleaving, and reserve the bank bits that differentiate between memory busses for multi-cache interleaving. In FIG. 2, bank bits that differentiate between memory bus segments are classified as "bank class B", with Nbmax representing the maximum number of bank bits available in this class.

Finally, consider the memory access patterns associated with DRAM page interleaving. DRAM page interleaving causes contiguous (or proximate) DRAM pages to be stored in separate banks, thereby allowing a program to have a memory hot spot that remains open in more than one bank. The memory access patterns associated with DRAM page interleaving tend to be serial in nature, and tend to be of the same type. For example, when program code is loaded into the cache, the program code will be loaded sequentially and most of the memory operations will be memory read operations. Similarly, when a program writes a block of data back to memory, the block of data will first be written to the cache, and the corresponding cache lines where the data is stored will all be dirty. If the cache lines that are replaced where also "dirtied" in a similar manner, then the cache lines that are cast out form the cache will tend to be serial and most of the operations will be memory write operations. Of course, the memory access patterns associated with DRAM page interleaving are well served by bank bits that differentiate between memory busses and bank bits that differentiate between memory bus segments. However, the memory access patterns associated with DRAM page interleaving are also well served by bank bits that differentiate between banks on a single memory bus segment. As discussed above, within a single memory bus segment, only one memory operation of one type may be active at a time, and DRAM page interleaving tends to produce serial memory operations of the same type. In FIG. 2, bank bits that differentiate between banks on the same memory bus segment are classified as "bank class C", with Ncmax representing the maximum number of bank bits available in this class.

Note that the page hit rate is unaffected by the allocation of memory interleaving schemes based on the classification of available bank bits. However, the percentage of concurrent memory transactions is increased by allocating memory interleaving schemes based on the classification of bank bits, as described above. Accordingly, overall memory efficiency is increased.

Returning to table 38 in FIG. 7, Namax, Nbmax, and Ncmax represent the maximum number of bank bits associated with each class, and Nmax is equal to Namax+Nbmax+Ncmax. In table 38 (based on the memory hierarchy shown in FIG. 2), Namax is one, Nbmax is two, and Ncmax is 5. The number of rows in table 38 is (Namax+1)*(Nbmax+1)*(Ncmax+1). Accordingly, the number of rows in table 38 is 36. To find the interleaving scheme for a particular memory configuration, first access the row having corresponding to the number of bank bits associated with each class. The interleaving scheme associated with that particular memory configuration is found along the columns of that row. Note that the interleaving schemes are allocated by accessing a row from right to left. In other words, the right most Na columns represent the interleaving schemes assigned to the bank bits in class A, the next Nb columns (moving from right to left) represent the interleaving schemes assigned to the bank bits in class B, and the next Nc columns (moving from right to left) represent the interleaving schemes assigned to the bank bits in class C.

For example, assume that in FIG. 2, slots 0, 3, 6, 9, 12, 15, 18, and 21 are populated with memory modules of equal size, with each memory module having two memory banks. In this example, Na is one, Nb is two, and Nc is one. Therefore, N is 4. This memory configuration is represented by row 40 in table 38. Accordingly, the single class A bank bit is assigned to multi-cache line interleaving, the two class B bank bits are assigned to cache effect interleaving, and the single class C bank bit is assigned to DRAM page interleaving.

As mentioned above, assigning memory interleaving schemes based on bank bit classifications increases the percentage of concurrent memory transactions without affecting the page hit rate. The page hit rate is only affected by the number of bank bits allocated to each memory interleaving scheme. Therefore, it may be desirable to assign a memory interleaving scheme to a bank bit in a particular class to increase the page hit rate, even though doing so will not affect the percentage of concurrent memory transactions. For example, consider row 42 of table 38. The single bank bit in class A is assigned to multi-cache line interleaving, the two bank bits in class B are assigned to cache effect interleaving, and the five bank bits in class C are assigned to DRAM page interleaving. Reallocating one of the class C bank bits from DRAM page interleaving to multi-cache line interleaving should not affect the percentage of concurrent memory transactions since only one memory operation of one type may be active on a memory bus segment at one time. However, the overall page hit rate may increase if the increase in the page hit rate caused by allocating an additional bank bit to multi-cache line interleaving is greater than the decrease caused by removing a bank bit from DRAM page interleaving.

Note that it might not be possible to classify a bank bit in a particular class, even though the bank bit is used (at least in part) to differentiate between banks at a related level of hierarchy. For example, consider a memory system having four identical memory modules in slots 0, 3, 6, and 12 in FIG. 2, with each memory module having a single bank. Two bank bits are present. Even though both memory busses provided by controller 22 are being used, both bank bits must be decoded to determine which memory bus should be used. Therefore, it is not possible classify either of the bank bits as class A. Both bank bits must be classified as class B. Similarly, in a memory system having four identical memory modules in slots 0, 1, 2, and 3, with each memory module having a single bank, two bank bits are also present. Even though two memory bus segments provided by memory buffer/multiplexer unit 26 are being used, both bank bits must be decoded to determine which memory bus segment should be used. Therefore, it is not possible classify either of the bank bits as class B, and both bank bits must be classified as class C. For these reasons, it is desirable that one who inserts memory modules into a computer system incorporating the present invention distribute the memory modules evenly to allow bank bits to be classified as high as possible.

The embodiment of the present invention represented by table 38 provides maximum flexibility because it is easy to repeatedly alter the memory interleaving scheme distribution to find the optimal distribution for a particular computer system configuration, as described above. However, it is also within the scope of the present invention to assign interleaving schemes based on an algorithm. For example, one simple algorithm in accordance with the present invention is to assign class A bank bits to multi-cache line interleaving, cache B bank bits to cache effect interleaving, and cache C bank bits to DRAM page interleaving. A more complex algorithm may allocate class C bank bits to cache effect interleaving or multi-cache line interleaving if a certain number of class C bank bits have already been assigned to DRAM page interleaving. However, since it is desirable to try a variety of memory interleaving scheme distributions to find the optimum distribution for a particular computer system, the table-based approach is the preferred embodiment.

In the prior art, assigning a typical interleaving scheme was trivial because typically memory controllers only supported one type of interleaving scheme, and all bank bits were allocated to the single scheme. However, assigning interleaving schemes in the memory controller disclosed by Anurag P. Gupta et. al is more complex because the memory controller supports three memory interleaving schemes, and the page hit rate is affected by the allocation of schemes. The present invention addresses this problem by providing a memory interleaving scheme lookup table.

The present invention also encompasses the realization that the percentage of concurrent memory operations may be increased by assigning memory interleaving schemes to bank bits based on the classification of bank bits, as described above. The present invention provides this advantage via the memory interleaving scheme lookup table, or by using an algorithm to assign bank bits to memory interleaving schemes based the classification of the bank bits.

The present invention has been described with reference to a memory controller that supports multi-cache line interleaving, cache effect interleaving, and DRAM page interleaving, and the memory access patterns supported by the memory system organization shown in FIG. 2. However, those skilled in the art will recognize that the concepts discussed herein can also be applied to other memory interleaving schemes, as well as other memory system organizations having different memory access patterns.

Although the present invention has been described with reference to preferred embodiments, workers skilled in the art will recognize that changes may be made in form and detail without departing from the spirit and scope of the invention.

What is claimed is:

1. A method of assigning bank bits to memory interleaving schemes in a computer system that supports multi-cache line interleaving and cache effect interleaving, wherein the computer system includes a memory organization having a plurality of memory busses, wherein two or more memory busses can each perform independent memory transactions simultaneously, with each memory bus coupled to a plurality of memory bus segments, wherein a read operation on a memory bus segment coupled to a first memory bus can be overlapped with write operation on another memory bus segment coupled to the first memory bus, and each memory bus segment is coupled to one or more memory banks, the method comprising:

assigning one or more bank bits that differentiate between memory banks coupled to different memory busses to multi-cache line interleaving; and assigning one or more bank bits that differentiate between memory banks coupled to different memory bus segments but the same memory bus to cache-effect interleaving.

* * * * *